US012518566B1

(12) United States Patent
Nistico et al.

(10) Patent No.: US 12,518,566 B1
(45) Date of Patent: Jan. 6, 2026

(54) EYE BIOMETRIC AUTHENTICATION USING COHERENCE-BASED MEASUREMENT

(71) Applicant: Apple Inc., Cupertino, CA (US)

(72) Inventors: Walter Nistico, Redwood City, CA (US); Seyedeh Mahsa Kamali, San Jose, CA (US); Samuel Steven, Cupertino, CA (US); Huiyang Deng, San Jose, CA (US); Avery L. Wang, Palo Alto, CA (US); Xibin Zhou, Palo Alto, CA (US); Edward Vail, Menlo Park, CA (US); Tong Chen, Fremont, CA (US)

(73) Assignee: Apple Inc., Cupertino, CA (US)

( * ) Notice: Subject to any disclaimer, the term of this patent is extended or adjusted under 35 U.S.C. 154(b) by 419 days.

(21) Appl. No.: 17/947,267

(22) Filed: Sep. 19, 2022

Related U.S. Application Data

(60) Provisional application No. 63/248,066, filed on Sep. 24, 2021.

(51) Int. Cl.
*G06V 40/18* (2022.01)
*G06V 40/19* (2022.01)

(52) U.S. Cl.
CPC ............ *G06V 40/197* (2022.01); *G06V 40/19* (2022.01); *G06V 40/193* (2022.01)

(58) Field of Classification Search
CPC ..... G06V 40/197; G06V 40/19; G06V 40/193
See application file for complete search history.

(56) References Cited

U.S. PATENT DOCUMENTS

| | | | |
|---|---|---|---|
| 9,808,154 | B2 | 11/2017 | Cleland et al. |
| 10,149,615 | B2 | 12/2018 | Sakai et al. |
| 10,820,840 | B2 | 11/2020 | Hogan |
| 10,848,753 | B1 | 11/2020 | Cavin |
| 10,963,046 | B1 | 3/2021 | Cavin |
| 11,126,000 | B2 | 9/2021 | Nicholson |

(Continued)

FOREIGN PATENT DOCUMENTS

| | | |
|---|---|---|
| CN | 104997482 A | 10/2015 |
| CN | 105078404 B | 11/2015 |

(Continued)

OTHER PUBLICATIONS

Pattmöller, Johanna, et al. "Correlation of corneal thickness, endothelial cell density and anterior chamber depth with ocular surface temperature in normal subjects." Zeitschrift für Medizinische Physik 25.3 (2015): 243-250. (Year: 2015).*

(Continued)

*Primary Examiner* — Ross Varndell
*Assistant Examiner* — Nhut Huy Pham
(74) *Attorney, Agent, or Firm* — Thompson Hine LLP (57) ABSTRACT

Various implementations disclosed herein include devices, systems, and methods that authenticate a user's identity by generating a representation of the eye (e.g., a signature) using coherence-based measurement (e.g., optical coherence tomography (OCT)). The coherence-based measurement may provide sub-surface information, e.g., depth, cross section, or a volumetric model of the eye, based on reflections/scattering of light, e.g., using relatively long wavelength light to penetrate into the eye tissue.

25 Claims, 5 Drawing Sheets

(56) References Cited

U.S. PATENT DOCUMENTS

| | | |
|---|---|---|
| 11,567,570 B2 | 1/2023 | Eash |
| 11,815,684 B2 | 11/2023 | Hudman |
| 2013/0188140 A1* | 7/2013 | Bagherinia ........ G01B 9/02077 |
| | | 351/246 |
| 2013/0301009 A1 | 11/2013 | Hacker |
| 2016/0270656 A1* | 9/2016 | Samec ................ A61B 3/1035 |
| 2017/0332899 A1 | 11/2017 | Walsh |
| 2019/0090733 A1 | 3/2019 | Walsh |
| 2019/0150799 A1* | 5/2019 | Hogan ................... G06V 40/70 |
| 2021/0045631 A1 | 2/2021 | Birkner |
| 2023/0000341 A1* | 1/2023 | Robledo ................. A61B 3/10 |
| 2024/0041321 A1 | 2/2024 | Gibson |

FOREIGN PATENT DOCUMENTS

| | | | |
|---|---|---|---|
| CN | 117310971 A | 12/2023 | |
| DE | 102012200867 A1 | 7/2013 | |
| WO | WO-2021106987 A1 * | 6/2021 | ............ A61B 3/102 |
| WO | 2021144036 A1 | 7/2021 | |
| WO | 2023049088 A1 | 3/2023 | |
| WO | 2023065042 A1 | 4/2023 | |

OTHER PUBLICATIONS

Kerbage, C. et al., "Large depth-high resolution full 3D imaging of the anterior segments of the eye using high speed Optical Frequency Domain Imaging," Optical Express, vol. 15, No. 12, pp. 7117-7125 Apr. 11, 2007.

\* cited by examiner

EYE BIOMETRIC AUTHENTICATION USING COHERENCE-BASED MEASUREMENT

CROSS-REFERENCE TO RELATED APPLICATIONS

This application claims the benefit of U.S. Provisional Application Ser. No. 63/248,066 filed Sep. 24, 2021, which is incorporated herein in its entirety.

TECHNICAL FIELD

The present disclosure generally relates to authenticating the identities of users of electronic devices, and in particular, to systems, methods, and devices for authenticating users based on coherence-based measurements.

BACKGROUND

Some existing systems use light reflected off front surfaces of the iris of an eye to perform iris authentication to authenticate a user. Other techniques use images of a retina to identify a unique blood vessel pattern to authenticate a user. The robustness, accuracy, and/or efficiency of existing eye-based authentication techniques may be improved.

SUMMARY

Various implementations disclosed herein include devices, systems, and methods that authenticate a user's identity by generating a representation of the eye (e.g., a signature) using coherence-based measurement (e.g., optical coherence tomography (OCT)). The coherence-based measurement may provide sub-surface information, e.g., depth, cross section, or a volumetric model of the eye, based on reflections/scattering of light, e.g., using relatively long wavelength light to penetrate into the eye tissue.

Some implementations involve a method of determining eye characteristics at an electronic device having a processor. The processor may execute instructions stored in a non-transitory computer-readable medium to implement the method. The method may obtain a first representation (e.g., a unique signature) of an eye. The first representation may have been determined based on a first scan having information about thickness or 3D volumetric structure of a portion of an eye or based on a 3D volumetric model generated based on such a scan. This prior scan may have been a dense coherence-based scan involving slow scanning to achieve high accuracy for an A-scan along Z/depth axis and a B-Scan along the X axis and Y axis.

In order to authenticate the user, the method generates a second scan having information about thickness or 3D volumetric structure of the portion of an eye. The second scan involves detecting coherent interference between a split off wave of a projected wave and a reflection or scattering of the projected wave. The second scan may be an OCT scan. The second scan may be a dense scan or a sparse scan, e.g., a sparse scan on a localized area of the eye. In some implementations, a preliminary mode is performed to detect if there is an eye present and/or locate the eye using a scan this is constrained with respect to wavelength modulation/depth so that a more resource/power intensive scan may focus on locations of specific eye features.

The method determines a second representation (e.g., a unique signature) of the eye based on the second scan, where the second representation includes at least one spatial feature of the eye. The spatial feature may be determined via feature extraction. The spatial feature may include a thickness or depth of a portion of the eye. As non-limiting examples, the spatial features may include the thickness/shape of the cornea, thickness/shape of the crystallin lens, an iris texture pattern and 3D structure including thickness of ridges and valleys, thickness of retina tissue, and/or blood vessel shape and 3D structure.

The method authenticates the user by comparing the second representation with the first representation of the eye. The comparison may involve comparing the first representation (e.g., a current signature) with a database of representations (e.g., prior signatures) of many users. The authentication may further involve comparing images of the iris, retina, etc. to add robustness to the coherence-based signature comparison.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1:
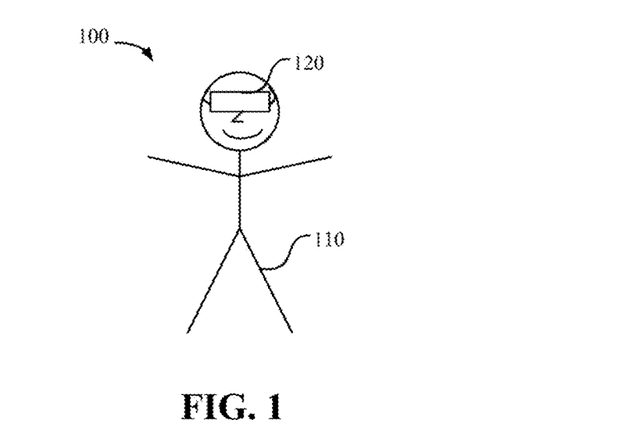
FIG. 1 illustrates an example operating environment in accordance with some implementations.

FIG. 1 is a block diagram of an example operating environment 100. In some implementations, the user wears the device 120 on his/her head. As such, the device 120 may include one or more displays configured to display content. The device 120 may enclose the field-of-view of the user. In some implementations, the device 120 is a handheld electronic device (e.g., a smartphone or a tablet) configured to present content to the user. In some implementations, the device 120 is replaced with a chamber, enclosure, or room configured to present content in which the user does not wear or hold the device 120.

Figure 2:
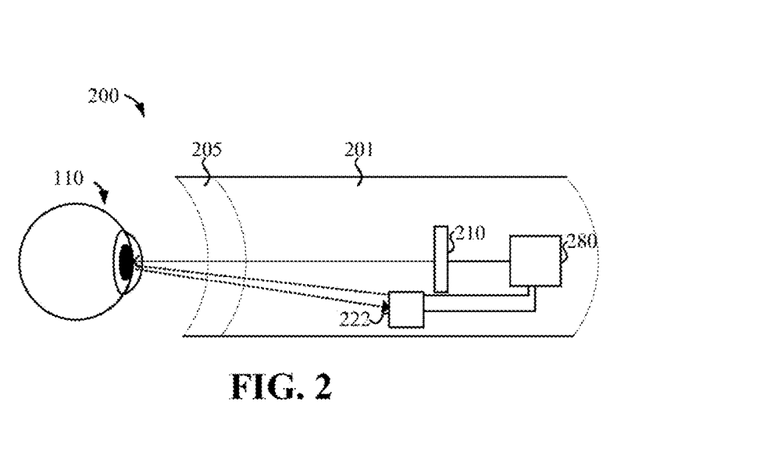
FIG. 2 illustrates an example head-mounted device (HMD) in accordance with some implementations.

FIG. 2 illustrates an example head-mounted device (HMD) 200 which may be an example of device 120. The HMD 200 includes a housing 201 (or enclosure) that houses various components. The housing 201 includes (or is coupled to) an eye pad 205 disposed at a proximal (to the user 110) end of the housing 201. In various implementations, the eye pad 205 is a plastic or rubber piece that comfortably and snugly keeps the head-mounted device 200 in the proper position on the face of the user 110 (e.g., surrounding the eye of the user 110).

The housing 201 houses a display 210 that displays an image, emitting light towards the eye of a user 110. In various implementations, the display 210 emits the light through an eyepiece (not shown) that refracts the light emitted by the display 410, making the display appear to the user 110 to be at a virtual distance farther than the actual distance from the eye to the display 210. For the user to be able to focus on the display 210, in various implementations, the virtual distance is at least greater than a minimum focal distance of the eye (e.g., 7 cm). Further, in order to provide a better user experience, in various implementations, the virtual distance is greater than 1 meter.

Although FIG. 2 illustrates an HMD 200 including a display 210 and an eye pad 205, in various implementations, the HMD 200 does not include a display 210. In some implementations, the HMD 200 includes an optical see-through display, for example, including a lens or transparent substrate that includes a waveguide configured to display virtual content within a view of a physical environment viewed through the lens or transparent substrate.

The housing 201 also houses an authentication system including a coherence-based measurement device 222 and a controller 280. The coherence-based measurement device 222 may include a wave source that direct waves (e.g., light) toward the eye of the user 110 at least some of which penetrates the eye's front surfaces and into interior portions of the eye structures and reflects or is scattered by interior aspects of the eye structures. The reflected and/or scattered waves may be detected by the coherence-based measurement device 222 (e.g., a sensor). Based on the reflections/scatterings, the controller 480 can generate 3D volumetric representations of the eye and/or determine unique data (e.g., signatures) that uniquely represents the 3D structure of the eye, which may be used in user authentication. Thus, in various implementations, the waves are emitted by the one or more wave sources, reflected or are scattered off portions of the eye of the user 110, and are detected by one or more sensors for use in user authentication.

In some implementations, the coherence-based measurement device 222 is an optical coherence tomography (OCT) device. The coherence-based measurement device 222 may produce waves (e.g., light) that are directed towards the eye of the user 110, splitting off a portion of the waves for coherence measurement purposes. The coherence-based measurement device 222 may use multiple wavelengths that penetrate the tissue of the eye to varying extents before being reflected or scattered. The reflections or scatterings of the waves are sensed by the coherence-based measurement device 222 by interfering them with the portion of the waves that were split off. A Fourier transform of the wavelength dependent signal that is received is used to produce data that represents 3D volumetric information, a depth profile, or cross-section of a portion of the eye. Areas of the eye that are similar to water, e.g., interior portions of the eye structures, may reflect or scatter few waves versus areas of the eye, such as the front and back edges of the cornea, which may reflect or scatter relatively more of the waves. In some OCT implementations, the coherence-based measurement device 222 may produce variable or swept frequencies to produce reflections/scatterings at different depths within the tissue. The reflection/scattering of the waves at different depths may thus provide information about the composition of the internal structures of the eye. Accordingly, the coherence-based measurement device 222 may be used to produce data from which a 3D volumetric structure, depth characteristics, and other such attributes can be determined.

The display 210 may emit light in a first wavelength range and the coherence-based measurement device 222 may emit light in a second wavelength range. Similarly, the coherence-based measurement device 222 may detect light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm). In one example, the coherence-based measurement device 222 is configured to produce infrared light centered at a wavelength of about 850 nm.

In various implementations, user authentication based on coherence-based measurements from the coherence-based measurement device 222 is performed to permit and/or enable user interaction on the device. For example, user authentication may be performed to determine whether a user should be enabled to use the device, use certain features available on or through the device, and/or to continue such uses.

Figure 3:
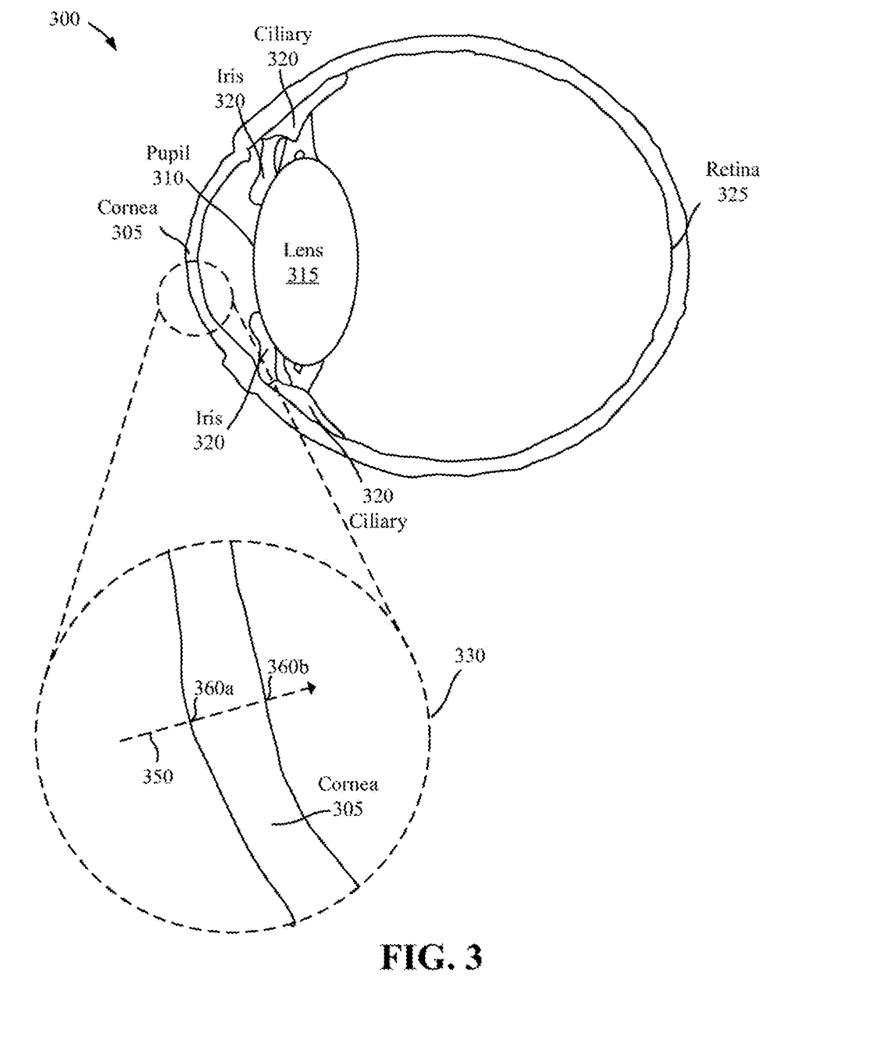
FIG. 3 illustrates an exemplary coherence-based measurement on an exemplary eye in accordance with some implementations.

FIG. 3 illustrates an exemplary coherence-based measurement on an exemplary eye 300. In this example, a cross sectional view of the eye 300 is used to illustrate some portions of the eye 300. The eye 300 includes a cornea 305, a pupil 310, a lens 315, an iris 320, ciliary muscles 320, retina 325 and additional portions not shown and/or labelled. In this example, A coherence-measurement is illustrated using a close up view 330 of a portion of the cornea 305. Waves of various wavelengths are directed through the eye 300, e.g., in direction 350. Due the different wavelengths, the waves penetrate the cornea 305 to different degrees before being reflected or scattered by the cornea 305. Some of the reflected or scattered waves are captured by a sensor and used with the original waves (e.g., via a coherence assessment) to determine depth and/or 3D volumetric information of the cornea 305. In one example, such information may be used to determine the depth of the cornea at the position of direction 350 (e.g., at the position of a ray passing into/through the cornea 305 at that location). Rays in multiple directions may penetrate the eye 300 in various directions providing depth information of the eye structures in those various directions.

Figure 4:
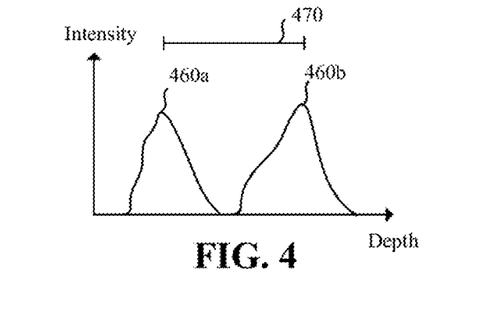
FIG. 4 illustrates data from an exemplary coherence-based measurement of an eye in accordance with some implementations.

For example, FIG. 4 illustrates data from an exemplary coherence-based measurement of an eye in the direction 350. Such an assessment (e.g., an OCT A-scan along a Z/depth axis) may produce an interference signal in which intensity varies for different depths (e.g., there may be more or less reflection/scattering at different depth depending upon the composition and/or structure of the eye portion at those depths). As shown in FIG. 4, the intensity includes a peak 460a and a peak 460b, corresponding to the front surface 360a and back surface 360b of the cornea 305. Such data may be used in various ways. For example, such information may be used to determine the depth 470 of the cornea 305 at the location of the direction 350. Such measurements may be repeated at different location on cornea 305 and for other eye structures to determine depth and/or 3D volumetric information representing many or all of the structures of the eye. Such information may be used to generate a 3D point cloud or other 3D model of the eye 300.

In some implementations, the coherence-based measurements provide range measurements based on the interference between a projected wave and the same wave reflected/scattered back. Such measurements may be used to creates 3D volumetric scans of the eye, based on measuring through tissues and providing information about the eye structures including their thickness. For example, thickness information may be provided with less than 10 µm accuracy. In some implementations, the coherence-based measurements include scanning performed in multiple directions and/or using multiple techniques. For example, the scanning may include an A-scan, along a Z/depth axis, and/or a B-scan, along an X axis and a Y axis. A B-scan may be performed using a micromirror (MEMS mirror). In some implementations, a scan, such as an A-scan, is performed by moving a reference mirror.

Figure 5:
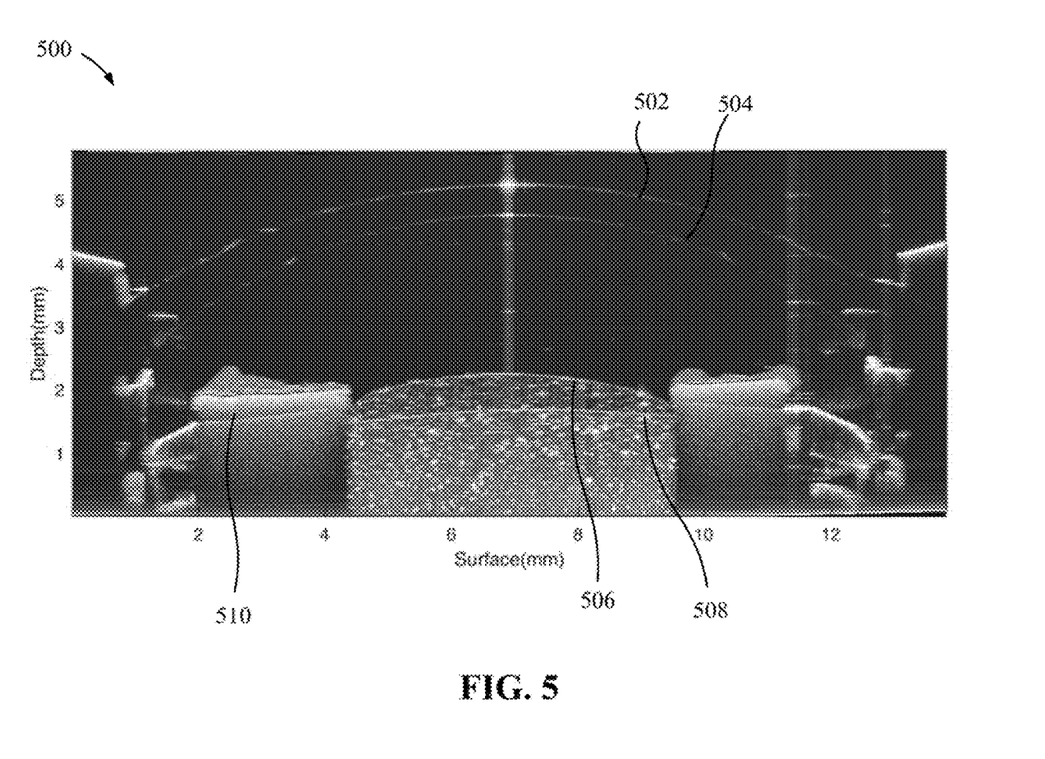
FIG. 5 illustrates data from an exemplary coherence-based measurement of an eye in accordance with some implementations.

FIG. 5 illustrates an image 500 depicting data from exemplary coherence-based measurements of an eye 300 produced in accordance with some implementations. In this example, the image 500 includes a depiction 502 of a front surface of the cornea 305, a depiction 504 of the back surface of the cornea 305, a depiction 506 of the front surface of the lens 315, a depiction 508 of the back surface of the lens 315, and a depiction 510 of the shape of the iris 320. Such information representing the depths and 3D volumetric shape of aspects of the eye 300.

Some implementations disclosed authenticate a user's identity based on information provided by a coherence-based measurement of the eye, e.g., using optical coherence tomography (OCT). For example, this may involve creating a representation (e.g. a signature) of a user's eye (e.g., once in a lifetime or infrequently) based on a first scan. This first scan may be a dense scan obtained by slow scanning to achieve high accuracy along A-scan and B-scan directions. A unique signature of the user's eye may be created based on or otherwise comprising spatial features. Such spatial features can include, for example, a combination of thickness and shape of the cornea, thickness and shape of the crystallin lens, iris texture pattern and 3D structures, including actual thickness or ridges and valleys, thickness of retinal tissue, blood vessel shape and 3D structure, etc.

This unique signature may be used to authenticate the user during subsequent use of the same device and/or different devices. In some implementations, such authentication may involve performing a fully dense scan, computing the user's unique signature based on the scan, and comparing the obtained signature against a known signature database. In other implementations, the authentication involves performing a sparse scan to determine the eye's position/orientation (e.g., with respect to 6 degrees of freedom), using the eye's position/orientation to predict the location of significant 3D features (e.g., a combination of cornea, iris, lens, retina), performing a sparse scan localized on areas of expected feature locations, computing the user's unique signature based on the scan, and comparing the obtained signature against the known signature database.

Figure 6:
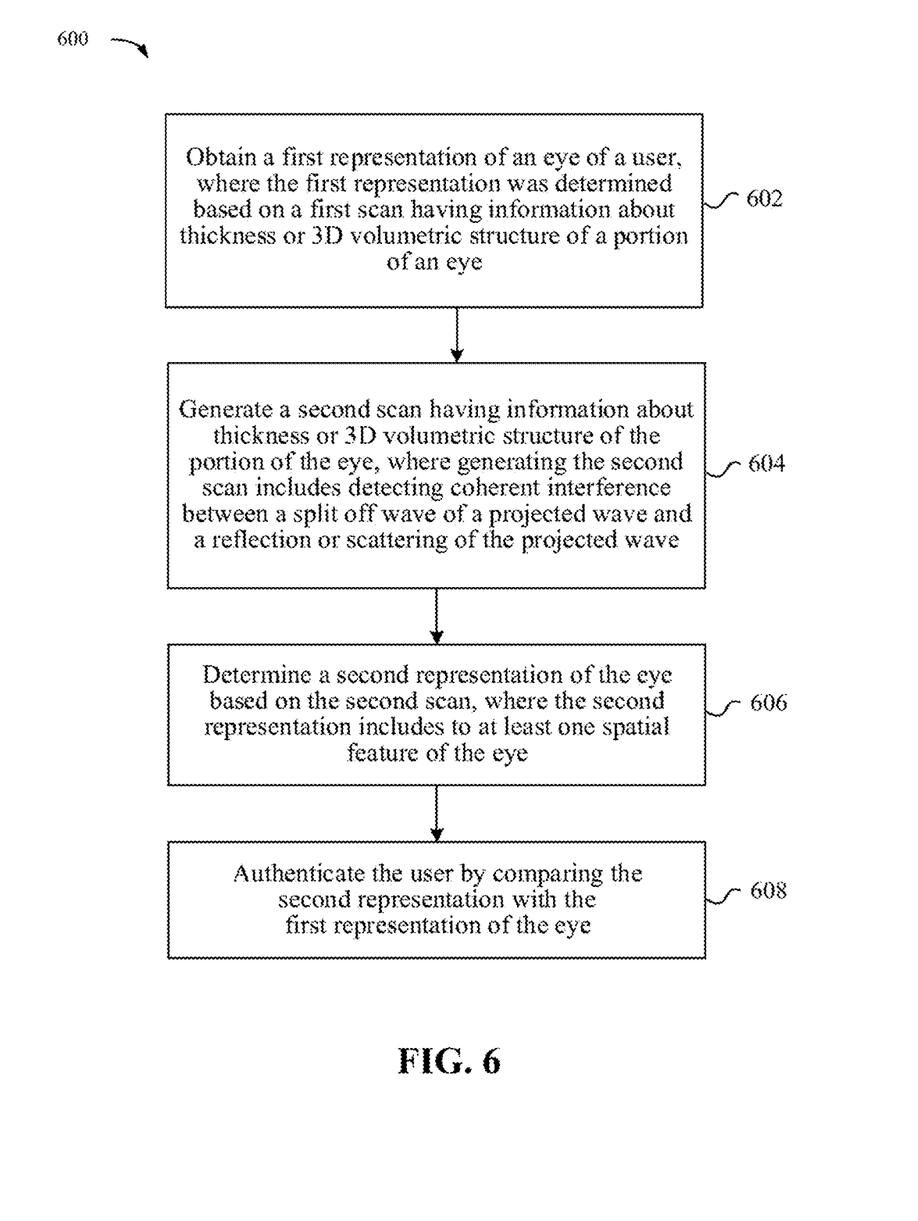
FIG. 6 is a flowchart representation of a method of user authentication in accordance with some implementations.

FIG. 6 is a flowchart representation of a method 600 of method of user authentication using coherence-based measurement. In some implementations, the method 600 is performed by a device (e.g., 120 of FIG. 1 or device 200 of FIG. 2), such as a head-mounted device, mobile device, desktop, laptop, or server device. In some implementations, the method 600 is performed by processing logic, including hardware, firmware, software, or a combination thereof. In some implementations, the method 600 is performed by a processor executing code stored in a non-transitory computer-readable medium (e.g., a memory).

At block 602, the method 600 obtains a first representation (e.g., a unique signature) of an eye of a user. The first representation was determined based on a first scan having information about thickness or 3D volumetric structure of a portion of an eye. The first representation of a user's eye may have been created during a prior user-device registration process. This first scan may be a dense scan obtained by slow scanning to achieve high accuracy along A-scan and B-scan directions.

The first representation may be created based on spatial features of the eye and thus comprise spatial features of the eye. These spatial features may include one or more of thickness and shape of the cornea, thickness and shape of the crystallin lens, iris texture pattern and 3D structures, including actual thickness or ridges and valleys, thickness of retinal tissue, blood vessel shape and 3D structure, etc. The first representation may exclude data corresponding to a contact lens. The first representation may be used to authenticate the user during subsequent use of the same device and/or different devices.

In some implementations, the first representation is a signature generated based on a 3D volumetric representation of the eye generated based on the coherence-based measurement. The 3D volumetric representation may have been generated based on a prior scan of the eye, which may be denser than subsequent scans used for authentication. A 3D representation may be a dense scan obtained by slow scanning to achieve high accuracy using A-scan and/or B-scan techniques. In some implementations, the 3D representation is a point cloud. In some implementations, the 3D representation is a 3D mesh, such as a mesh of triangular shapes corresponding to external and internal eye surfaces and shapes.

At block 604, the method 600 generates a second scan having information about thickness or 3D volumetric structure of the portion of the eye. Generating the second scan involves detecting coherent interference between a split off wave of a projected wave and a reflection or scattering of the projected wave. The second scan may involve a range measurement based on interference, e.g., optical coherence tomography. The scan may be a fully dense scan or a sparse scan, e.g., a sparse scan on a localized area of the eye.

In some implementations, a spatially sparse B-scan is performed initially. This may provide a sample of a sparse set of points of the eye (e.g., intercepts with cornea front and back surfaces, iris surfaces, pupil contour points, crystallin lens surfaces, ciliary muscles, points on the retina or choroid, etc.). The sparse scan may provide a grid, e.g., of 8×8 or 16×16 rays/directions. The sparse grid orientation and density may be smartly and dynamically controlled based on prior knowledge of past eye locations. A scan may be focused in the neighborhood of past eye feature locations, to obtain robust information used to authenticate the user. Some eye portions may provide richer, more unique identification information. Focusing a scan in those areas may produce more useful information in terms of authenticating the user.

Given a recent, previous scan, a subsequent reduced-scope scan may be performed. This may involve limiting or prioritizing the A-scan at expected eye surface edges, e.g., based on prior knowledge derived from recent measure eye positions/orientations. In some implementations, knowledge of eye position/orientation is used to optimize subsequent scanning, e.g., reducing the depth axis and/or density of a volumetric scan.

In some implementations, the coherence-based measurement involves optical coherence tomography (OCT). The coherence measurement may include projecting light using a plurality of wavelengths, where a first portion of the light is directed to the eye and a second portion of the light is split off from the first portion and determining sub-surface information based on interference between: a reflection or scattering of the first portion of the light from a sub-surface structure of the eye and the second portion of the light. Such sub-surface information may include depth information, a cross section of the eye, and/or a volumetric representation of the eye. Generating the scan may involve performing a first scan to sample a set of points of the eye (e.g., a B-scan) and performing a second scan based on the first scan (e.g., an A-scan), where the first scan and second scan have different scan types.

In some implementations, the scan produces a sparse set of points based on a grid. An orientation or density of the grid may be based on prior eye location information, e.g., a prior scan that determines an approximate location and/or orientation of the eye at a prior point it time.

In some implementations, a preliminary mode is used may detect if there is an eye present, e.g., locate the eye by constraining wavelength modulation/depth to conserve power and determine eye pose and then focus subsequent higher-powered scans on locations of specific eye features.

At block 606, the method 600 determines a second representation (e.g., a unique signature) of the eye based on the second scan, wherein the second representation comprises at least one spatial feature of the eye. The spatial features may be determined via an algorithm or machine-learning-based feature extraction technique. The spatial features may include a thickness or depth of a portion of the eye. As examples, the spatial features(s) may include the thickness/shape of the cornea, thickness/shape of the crystallin lens, an iris texture pattern and 3D structure including thickness of ridges and valleys, thickness of retina tissue, and/or blood vessel shape and 3D structure. The second representation may exclude data corresponding to a contact lens.

At block 608, the method 600 authenticates the user by comparing the second representation with the first representation of the eye. The comparison may involve comparing the first representation (e.g., the current signature) with a database of representations (e.g., signatures) of many users. The authentication may further involve comparing images of the iris, retina, etc. to add robustness to the coherence-based signature comparison. For example, the authentication may be further based on a glint-reflection technique and/or a retinal imaging technique.

The method 600 may continue to authenticate the eye over time during one or more uses of the device (and/or other devices) based on coherence-based measurements. In some implementations, the first representation (e.g., the user's stored unique signature that is used for authentications) is updated over time based on more recently obtained scan data, e.g., integrating deviations of sparse measurements relative to the representation over time.

In some implementations, the scans of the user's eye(s) provide movement information such as measures of velocity. Such movement information may be based on frame-by-frame differences in eye portions. Velocity and other movement information may be used to further reduce the amount of scanning that is required to authenticate the user by providing richer information for use in authenticating the user.

The techniques disclosed herein may provide various advantages, e.g., over existing techniques based on images of the iris or retina. Some of the techniques disclosed herein may provide benefits over existing iris-surface-based and retina-pattern-based authentication techniques and/or may be used in combination with such techniques to provide better authentication. The existing iris-surface-based and retina-pattern-based authentication techniques may be more sensitive to ambient light (e.g., sunlight) that technique using coherence-based measurements. For example, OCT may be insensitive to sunlight since the light source may be modulated at a higher frequency that the DC/low frequency ambient light. Coherence-based approaches disclosed herein may capture more information about the features of the eye (e.g., thickness of tissue, shape of cornea, lens, eyeball, etc., and may sample the iris as well as the retina features. This may provide improved identification accuracy (e.g., FAR/FRR) and robustness against occlusion. In addition, the coherence-based approaches disclosed herein may be more resistant to spoofing since spoofing a coherence-based authentication approach would require an attacker to create a 3D volumentric model of the user's eye. The coherence-based approaches may be more robust in terms of not requiring unobstructed views of portions of the eye and thus the source/sensors may be less constrained in terms of positioning on the device than prior techniques that required unobstructed views and thus were constrained in terms of camera placement.

Figure 7:
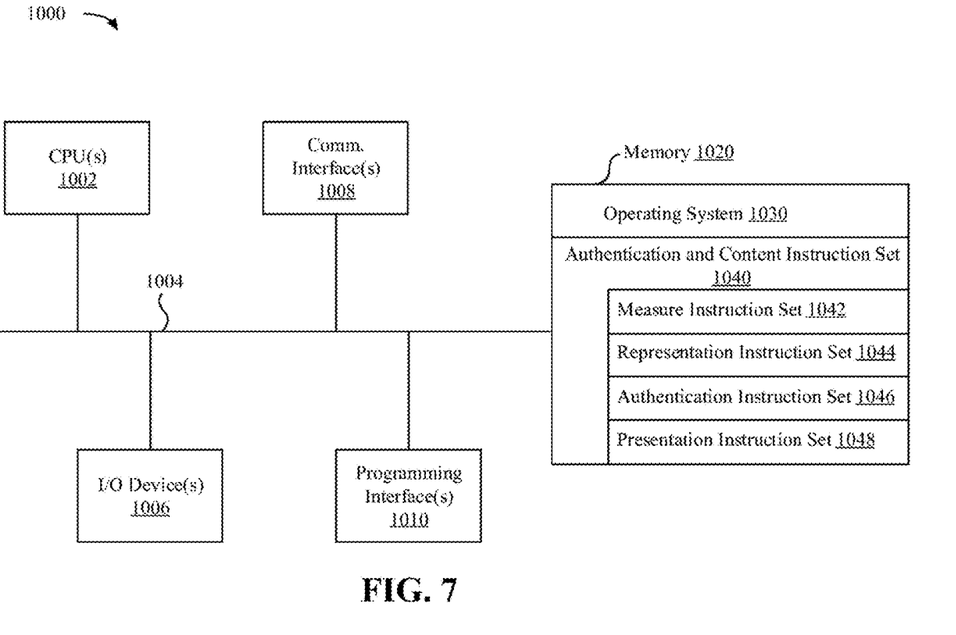
FIG. 7 illustrates components of an exemplary device in accordance with some implementations.

FIG. 7 is a block diagram of an example of the device 1000 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1000 includes one or more processing units 1002 (e.g., microprocessors, ASICs, FPGAs, GPUs, CPUs, processing cores, and/or the like), one or more input/output (I/O) devices and sensors 1006, one or more communication interfaces 1008 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 1010, one or more displays 1012, one or more interior and/or exterior facing image sensor systems 1014, a memory 1020, and one or more communication buses 1004 for interconnecting these and various other components.

In some implementations, the one or more communication buses 1004 include circuitry that interconnects and controls communications between system components. In some implementations, the one or more I/O devices and sensors 1006 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 1012 are configured to present the experience to the user. In some implementations, the one or more displays 1012 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 1012 correspond to diffractive, reflective, polarized, holographic, etc. waveguide displays. For example, the device 1000 includes a single display. In another example, the device 1000 includes a display for each eye of the user. In some implementations, the one or more displays 1012 are capable of presenting SR content.

In some implementations, the one or more image sensor systems 1014 are configured to obtain image data that corresponds to at least a portion of the face of the user that includes the eyes of the user. For example, the one or more image sensor systems 1014 include one or more RGB cameras (e.g., with a complimentary metal-oxide-semiconductor (CMOS) image sensor or a charge-coupled device (CCD) image sensor), monochrome cameras, IR cameras, event-based cameras, and/or the like. In various implementations, the one or more image sensor systems 1014 further include illumination sources that emit light upon the portion of the face of the user, such as a flash or a glint source.

The memory 1020 includes high-speed random-access memory, such as DRAM, SRAM, DDR RAM, or other random-access solid-state memory devices. In some implementations, the memory 1020 includes non-volatile memory, such as one or more magnetic disk storage devices, optical disk storage devices, flash memory devices, or other non-volatile solid-state storage devices. The memory 1020 optionally includes one or more storage devices remotely located from the one or more processing units 1002. The memory 1020 comprises a non-transitory computer readable storage medium. In some implementations, the memory 1020 or the non-transitory computer readable storage medium of the memory 1020 stores the following programs, modules and data structures, or a subset thereof including an optional operating system 1030 and a tracking and content instruction set 1040.

The operating system 1030 includes procedures for handling various basic system services and for performing hardware dependent tasks. In some implementations, the authentication and content instruction set 1040 is configured to present content to the user via the one or more displays 1012 based on authenticating the user. To that end, in various implementations, the tracking and content instruction set 1040 includes measure instruction set 1042, representation instruction set 1044, authentication instruction set 1046, and presentation instruction set 1048. The measure instruction set 1042 is configured to perform coherence-based measurements of one or more eyes as described herein. The representation instruction set 1044 is configured to generate representations (e.g., signatures) of the one or more eyes, for example, using eye measurements or other scans as disclosed herein. The authentication instruction set is configured to authenticate one or more users based on eye scan-based representations (e.g., signatures), as described herein. The presentation instruction set 1048 is configured to present views of physical environments and/or virtual environments (e.g., extended reality XR content) and/or to provide content or otherwise control a user experience based on user authentication.

Although these elements are shown as residing on a single device, it should be understood that in other implementations, any combination of the elements may be located in separate computing devices. Moreover, FIG. 8 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor:
   obtaining a first representation of an eye of a user, wherein the first representation was determined based on a first scan having information about thickness or 3D volumetric structure of a portion of an eye;
   generating a second scan having information about thickness or 3D volumetric structure of the portion of the eye, wherein generating the second scan comprises detecting coherent interference between a split off wave of a projected wave and a reflection or scattering of the projected wave;
   determining a second representation of the eye based on the second scan, wherein the second representation comprises at least one spatial feature of the eye; and
   authenticating the user by comparing the second representation with the first representation of the eye, wherein the comparing comprises comparing the at least one spatial feature represented in the second representation, the at least one spatial feature corresponding to the thickness of tissue of the portion of the eye, wherein the at least one spatial feature comprises: an iris texture pattern and 3D structures; or ridges and valleys.

2. The method of claim 1, wherein the coherence-based measurement comprises optical coherence tomography (OCT).

3. The method of claim 1, wherein the coherence measurement comprises:
   projecting light using a plurality of wavelengths, wherein a first portion of the light is directed to the eye and a second portion of the light is split off from the first portion; and
   determining sub-surface information based on interference between:
   a reflection or scattering of the first portion of the light from a sub-surface structure of the eye; and
   the second portion of the light.

4. The method of claim 3, wherein the sub-surface information comprises depth information, a cross section of the eye, or a volumetric representation of the eye.

5. The method of claim 1, wherein generating the second scan comprises performing a scan on a localized portion of the eye corresponding to one or more features.

6. The method of claim 1, wherein generating the second scan comprises:
   using a first scanning mode to determine that the eye is present;
   determining a position and orientation of the eye; and
   using a second scanning mode, different than the first scanning mode, to scan the eye based on the determined position and orientation of the eye.

7. The method of claim 1, wherein the first representation and second representation are signatures, volumetric representations, extracted feature sets that uniquely correspond to the eye.

8. The method of claim 1, wherein determining the second representation comprises identifying the spatial feature based on a feature extraction algorithm or machine learning model.

9. The method of claim 1, wherein the spatial feature comprises:

a thickness or shape of a cornea of the eye;
a thickness or shape of a crystallin lens of the eye;
a thickness or texture pattern of an iris;
a thickness of a retina; or
a volumetric shape of a blood vessel on the retina.

10. The method of claim 1, wherein the first and second representations represents:
a velocity corresponding to an eye movement.

11. The method of claim 1, wherein the first scan is denser than the second scan.

12. The method of claim 1, wherein the comparing comprises comparing the second representation with multiple representations of multiple eyes generated by prior scans of the multiple eyes.

13. The method of claim 1, wherein the device is a head-mounted device (HMD).

14. The method of claim 1 further comprising providing content based on authenticating the user.

15. The method of claim 1, wherein the authenticating is further based on a glint-reflection or retinal imaging technique.

16. An electronic device comprising:
a light source configured to project light using a plurality of wavelengths, wherein the light source is configured to direct a first portion of the light toward the eye and split off a second portion of the light;
a light sensor configured to capture the light reflected or scattered off sub-surface structures of the eye;
a non-transitory computer-readable storage medium; and
one or more processors coupled to the non-transitory computer-readable storage medium, wherein the non-transitory computer-readable storage medium comprises program instructions that, when executed on the one or more processors, cause the device to perform operations comprising:
obtaining a first representation of an eye, wherein the first representation was determined based on a first scan having information about thickness or 3D volumetric structure of a portion of an eye;
generating a second scan having information about thickness or 3D volumetric structure of the portion of an eye, wherein generating the second scan comprises detecting coherent interference between a split off wave of a projected wave and a reflection or scattering of the projected wave;
determining a second representation of the eye based on the second scan, wherein the second representation comprises at least one spatial feature of the eye; and
authenticating the user by comparing the second representation with the first representation of the eye, wherein the comparing comprises comparing the at least one spatial feature represented in the second representation, the at least one spatial feature corresponding to a texture pattern, ridges, or valleys associated with the thickness of tissue of the portion of the eye, wherein the at least one spatial feature comprises: an iris texture pattern and 3D structures; or ridges and valleys.

17. The electronic device of claim 16, wherein the coherence-based measurement comprises optical coherence tomography (OCT).

18. The electronic device of claim 16, wherein the coherence measurement comprises:
projecting light using a plurality of wavelengths, wherein a first portion of the light is directed to the eye and a second portion of the light is split off from the first portion; and
determining sub-surface information based on interference between:
a reflection or scattering of the first portion of the light from a sub-surface structure of the eye; and
the second portion of the light.

19. The electronic device of claim 18, wherein the sub-surface information comprises depth information, a cross section of the eye, or a volumetric representation of the eye.

20. A non-transitory computer-readable storage medium storing instructions executable on an electronic device to perform operations comprising:
obtaining a first representation of an eye, wherein the first representation was determined based on a first scan having information about thickness or 3D volumetric structure of a portion of an eye;
generating a second scan having information about thickness or 3D volumetric structure of the portion of an eye, wherein generating the second scan comprises detecting coherent interference between a split off wave of a projected wave and a reflection or scattering of the projected wave;
determining a second representation of the eye based on the second scan, wherein the second representation comprises at least one spatial feature of the eye; and
authenticating the user by comparing the second representation with the first representation of the eye, wherein the comparing comprises comparing the at least one spatial feature represented in the second representation, the at least one spatial feature corresponding to a texture pattern, ridges, or valleys associated with the thickness of tissue of the portion of the eye, wherein the at least one spatial feature comprises: an iris texture pattern and 3D structures; or ridges and valleys.

21. The method of claim 1, wherein the at least one spatial feature comprises a combination of thickness and shape of the cornea.

22. The method of claim 1, wherein the at least one spatial feature comprises a thickness and shape of a crystallin lens.

23. The method of claim 1, wherein the at least one spatial feature comprises an iris texture pattern and 3D structures.

24. The method of claim 1, wherein the at least one spatial feature comprises ridges and valleys.

25. The method of claim 1, wherein the at least one spatial feature comprises a thickness of retinal tissue and blood vessel shape.

* * * * *